United States Patent
Hinrich

(10) Patent No.: US 9,991,037 B2
(45) Date of Patent: Jun. 5, 2018

(54) ELECTRICAL MACHINE, COIL ASSEMBLY FOR AN ELECTRICAL MACHINE, AND METHOD FOR PRODUCING SAID COIL ASSEMBLY

(71) Applicant: Dr. Ing. h.c. F. Porsche Aktiengesellschaft, Stuttgart (DE)

(72) Inventor: Holger Hinrich, Leonberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 495 days.

(21) Appl. No.: 14/692,024

(22) Filed: Apr. 21, 2015

(65) Prior Publication Data

US 2015/0333588 A1    Nov. 19, 2015

(30) Foreign Application Priority Data

May 15, 2014   (DE) .................. 10 2014 106 851

(51) Int. Cl.
| | |
|---|---|
| *H02K 3/34* | (2006.01) |
| *H01F 5/00* | (2006.01) |
| *H02K 3/02* | (2006.01) |
| *H02K 3/18* | (2006.01) |
| *H02K 3/30* | (2006.01) |
| *H02K 3/00* | (2006.01) |

(52) U.S. Cl.
CPC ............. *H01F 5/00* (2013.01); *H02K 3/00* (2013.01); *H02K 3/02* (2013.01); *H02K 3/18* (2013.01); *H02K 3/30* (2013.01); *H02K 3/34* (2013.01)

(58) Field of Classification Search
CPC .. H02K 3/34; H02K 3/30; H02K 3/00; H02K 3/18; H02K 3/02; H01F 5/00

USPC .................................. 310/194, 49.13, 43
See application file for complete search history.

(56) References Cited

U.S. PATENT DOCUMENTS

| | | | | |
|---|---|---|---|---|
| 3,947,796 A * | 3/1976 | Postma | ............... | H01F 5/00 336/192 |
| 6,034,465 A * | 3/2000 | McKee | ............... | F04D 13/0666 310/156.23 |
| 6,509,665 B1 * | 1/2003 | Nishiyama | ............... | H02K 3/345 310/194 |
| 7,119,644 B2 * | 10/2006 | Snitchler | ............... | H01F 6/06 310/214 |
| 2006/0145548 A1 * | 7/2006 | Wakita | ............... | H02K 3/24 310/54 |

(Continued)

FOREIGN PATENT DOCUMENTS

| | | |
|---|---|---|
| DE | 10 2009 025 929 | 12/2010 |
| DE | 20 2009 015 119 | 4/2011 |

(Continued)

OTHER PUBLICATIONS

Chinese Office Action dated Mar. 30, 2017.
German Search Report dated Dec. 16, 2014.
Japanese Office Action dated Jan. 16, 2016.

*Primary Examiner* — Naishadh Desai
(74) *Attorney, Agent, or Firm* — Gerald E. Hespos; Michael J. Porco; Matthew T. Hepos

(57) ABSTRACT

A coil assembly (11) for an electrical machine has a coil former (12) composed of an electrically non-conductive material and a coil (13) held by the coil former (12) is composed of an electrically conductive material. The coil former (12) is produced from a ceramic material, the coil (13) is in the form of a coil molding.

10 Claims, 1 Drawing Sheet

(56) References Cited

U.S. PATENT DOCUMENTS

| | | | | |
|---|---|---|---|---|
| 2007/0252445 | A1* | 11/2007 | Shinohira | H02K 41/03 |
| | | | | 310/12.23 |
| 2009/0121820 | A1* | 5/2009 | Tatematsu | H02K 1/02 |
| | | | | 336/233 |
| 2011/0121930 | A1 | 5/2011 | Takeuchi et al. | |
| 2013/0169277 | A1 | 7/2013 | Huber et al. | |
| 2014/0125180 | A1 | 5/2014 | Thaler et al. | |
| 2014/0145806 | A1* | 5/2014 | Piascik | H01F 5/04 |
| | | | | 335/299 |
| 2015/0008779 | A1* | 1/2015 | Shi | H02K 1/16 |
| | | | | 310/89 |
| 2015/0194862 | A1* | 7/2015 | Sigler | H02K 9/22 |
| | | | | 310/64 |

FOREIGN PATENT DOCUMENTS

| | | |
|---|---|---|
| DE | 20 2010 022 523 | 12/2011 |
| DE | 10 2011 003 400 | 8/2012 |
| EP | 2 387 135 | 11/2011 |
| EP | 2 688 183 | 1/2014 |
| JP | S58116715 A | 7/1983 |
| JP | S61139240 A | 6/1986 |
| JP | H06351183 A | 12/1994 |
| JP | 2008035646 A | 2/2008 |
| JP | 2009153290 A | 7/2009 |
| JP | 2010104889 A | 5/2010 |

\* cited by examiner

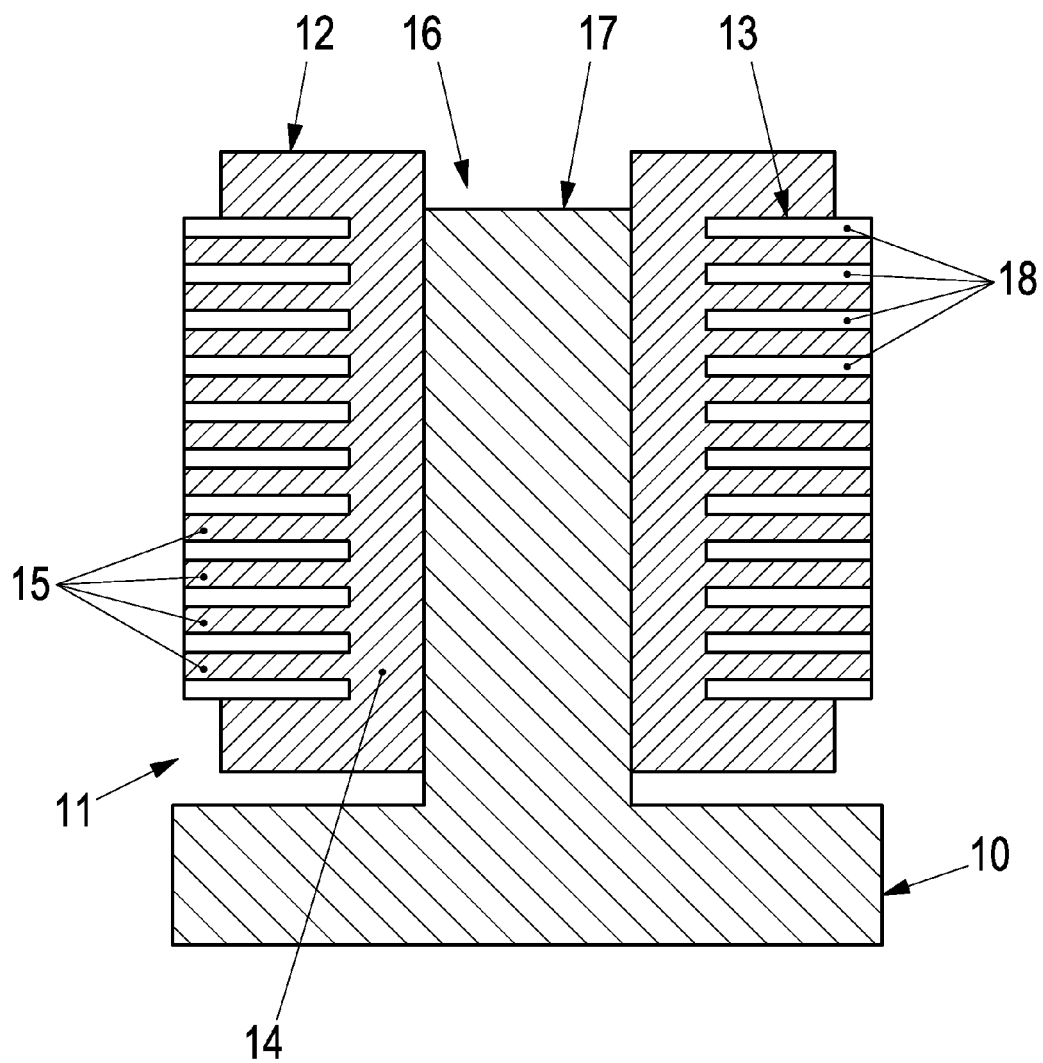

ELECTRICAL MACHINE, COIL ASSEMBLY FOR AN ELECTRICAL MACHINE, AND METHOD FOR PRODUCING SAID COIL ASSEMBLY

CROSS REFERENCE TO RELATED APPLICATION

This application claims priority under 35 USC 119 to German Patent Appl. No. 10 2014 106 851.3 filed on May 15, 2014, the entire disclosure of which is incorporated herein by reference.

BACKGROUND

1. Field of the Invention

The invention relates to an electrical machine. The invention further relates to a coil assembly for an electrical machine, and to a method for producing the coil assembly.

2. Description of the Related Art

Electrical machines used in electric vehicles or in hybrid vehicles as drive assemblies have a rotor and a stator. At least one rotor-end magnet is associated with the rotor and at least one stator-end coil assembly is associated with the stator. A coil assembly of an electrical machine has a coil former made of an electrically non-conductive material and a coil held by the coil former and composed of an electrically conductive material. The coil former typically is made from a plastic, and the coil typically is made from metal. The coil typically is formed by winding a metal wire around the plastic coil former to form coil windings of the coil.

The permissible power throughput by an electrical machine is limited by the thermal load-bearing capacity of the stator-end coil assemblies. A higher power throughput by the coil assemblies and therefore by the electrical machine can be ensured when lost heat can be dissipated effectively to ensure a higher machine power in given a constant installation space.

DE 10 2011 003 400 A1 discloses the basic structure of an electrical machine comprising a rotor and a stator where at least one stator-end coil assembly is associated with the stator.

DE 10 2010 022 523 A1 discloses encapsulating coil turns of a coil using an encapsulation compound that has a filler comprising nanoparticles.

US 2011/0121930 A1 discloses embedding a coil in a ceramic material.

The object of the invention is to provide a novel coil assembly for an electrical machine, a method for producing the coil assembly, and an electrical machine comprising at least one coil assembly of this kind.

SUMMARY OF THE INVENTION

The invention uses a coil former composed of a ceramic material in combination with a coil produced by molding in a coil assembly for an electrical machine. Heat is transferred from the coil of the respective coil assembly to the stator-end support of the electrical machine. The respective coil assembly connected to said stator-end support, can be improved by using a coil former composed of a ceramic material.

Ceramic materials have a high level of thermal conductivity, and therefore heat can be dissipated effectively from the coil of the coil assembly. A coil former composed of a ceramic material also has very good electrical insulation properties so that electrical flashovers can be prevented.

Thermal coupling of the coil material to the coil former can be improved by using a coil molding, which a coil produced by molding. As a result, heat can be dissipated better from the coil.

Furthermore, the so-called slot filling factor of the electrical machine is increased by using a coil produced by molding. Thus, the power yield and the degree of efficiency of the electrical machine can be improved.

The combination of a coil former composed of a ceramic material in combination with a coil produced by molding increases the achievable power yield and therefore the degree of efficiency of an electrical machine.

The coil may be molded onto the coil former or molded into the coil former. This aspect of the invention is particularly advantageous because the coil molded onto the coil former composed of ceramic material or molded into the coil former composed of the ceramic material does not need to be de-molded.

The coil former may form at least one part of the mold for molding the coil. The coil former accordingly functions to hold the coil and also functions as a mold. Thus, the coil former is used as a mold for the coil that is to be produced by molding. This allows particularly advantageous production of a coil assembly.

The coil former may be of integral design. As an alternative, the coil former may be of multipartite design, specifically comprising a main body and webs that form partition elements for coil turns of the molded coil.

The variant in which the coil former is of multipartite design is particularly advantageous. In this case, it is possible for the partition elements for the coil windings that are composed of a ceramic material to be particularly thin and to insert the partition elements into slots in the main body of the coil former. The main body is produced from a ceramic material. Thus, the main body and the webs together form the coil former that provides an inner shell of the mold required for molding the coil. The webs are fixed into the slots in the main body before molding by means of an outer shell. After the coil has been molded and the outer shell has been removed, the main body and the webs are held together by the molded-on or molded-in coil. The coil is not de-molded from the inner shell, but instead the coil former, which forms the inner shell of the mold, is an integral constituent part of the coil assembly used in the electrical machine.

Exemplary embodiments of the invention are explained in greater detail with reference to the drawing, without being restricted hereto.

BRIEF DESCRIPTION OF THE DRAWING

FIG. 1 is a schematic detail of an electrical machine according in the region of a coil assembly according to the invention.

DETAILED DESCRIPTION

The invention relates to a coil assembly for an electrical machine, to a method for producing the coil assembly, and to an electrical machine comprising the coil. The invention preferably is used in electrical machines that provide drive power in hybrid vehicles or electric vehicles.

An electrical machine of the invention may be a synchronous machine with permanent-magnet excitation or external excitation, or an asynchronous machine with magnetic-field generation by electrically conductive coils positioned on an iron core. Although the invention preferably is used in electrical machines of this kind, it is also possible to use the invention in other electrical machines.

FIG. 1 shows a highly schematic detail of an electrical machine in the form of a synchronous machine with permanent-magnet excitation, in the region of a stator-end support 10 and of a coil assembly 11 positioned on the stator-end support 10.

The stator-end support 10 of the synchronous machine is a support composed of an iron material and may be called an iron core. The stator-end support 10 and the coil assembly 11 of FIG. 1 are stator-end assemblies of the electrical synchronous machine that interact with rotor-end magnets, not shown.

A coil assembly 11 according to the invention has a coil former 12 composed of an electrically non-conductive material and also has a coil 13 held by the coil former 12 and composed of an electrically conductive material.

The coil former 12 of the coil assembly 11 is produced from a ceramic material, preferably a ceramic sintered material, such as a ceramic aluminum oxide, a ceramic aluminum nitrite or a ceramic silicon nitrite. The coil 13 is produced from a metal material, such as an aluminum alloy or a copper alloy. The coil 13 is a coil molding, and hence is produced by a molding process.

The use of a metal coil 13 in the form of a coil molding in combination with a coil former 12 composed of a ceramic material provides a particularly high power yield and therefore a particularly high degree of efficiency for the coil assembly 11 or an electrical machine with at least one coil assembly 11 of this kind.

Therefore, the combination of the metal coil 13 in the form of a coil molding and the coil former 12 composed of a ceramic material enables optimal removal of heat from the coil 13 of the coil assembly 11 in the direction of the stator-end support 10 of the electrical machine.

Coils 13 that have been produced by molding are thermally coupled to the material of the coil former 12 in an optimum manner. A ceramic material of the coil former 12 has a high degree of thermal conductivity and accordingly can dissipate heat produced in the region of the coil 13 in an optimum manner.

The coil 13 preferably is molded onto or molded into the coil former 12. Accordingly the coil former 12 composed of the ceramic material is used as at least part of a mold that is required to produce the coil 13 by molding. According to this advantageous development, the coil 13 is molded into the coil former 12 composed of the ceramic material or is molded onto the coil former, so that the coil 13 does not need to be de-molded from the coil former 12, which serves as a mold, but rather at least one part of the mold that is required for molding the coil 13 forms an integral constituent part of the coil assembly 11.

According to a first variant of the invention, it is possible to use an integral coil former 12 composed of a ceramic material.

The coil former 12 of the respective coil assembly 11 may be of multipartite design and may comprise a main body 14 and a plurality of webs 15. The webs 15 form electrically insulating partition elements for coil turns 18 of the coil 13, and are produced as separate assemblies from a ceramic material. The webs 15 preferably are inserted into slots in the main body 14 of the coil former 12. The main body is produced separately from a ceramic material. As a result, it is possible to form thin partition elements between the coil turns of the molded coil 13. The main body 14 with the webs 15 inserted into the slots in the main body 14 forms an inner part of a mold for the coil 13 that is to be produced by molding. The inner part of the mold is surrounded radially on the outside by an outer part of the mold.

The webs 15 in the main body 14 of the coil former 12 are held by the outer part of the mold before the coil 13 is molded. To mold the coil 13, this mold is filled with the metal material of the coil 13. The outer part of the mold is removed after the material has hardened. The coil 13 that has been produced by molding connects the webs 15 to the main body 14 of the coil former 12. The main body 14 and the webs 15 that form the inner part of the mold are integral constituent parts of the coil assembly 11 produced in this way. De-molding the coil 13 from the inner part of the mold is dispensed with, and instead the coil assembly 11 produced in this way comprises the coil former 12 and the coil 13 mounted on the stator-end support 10 by the coil former 12.

The coil assembly 11 preferably is mounted on the stator-end support 10 so that the coil former 12 of the coil assembly 11 has a recess 16 into which a projection 17 of the stator-end support 10 is introduced.

The coil assembly 11 accordingly is fit onto the stator-end support 10 or mounted on said stator-end support. The projection 17 of the stator-end support 10 engages into the recess 16 in the coil former 12. In the process, the coil assembly 11 circumferentially surrounds the projection 17 of the stator-end support 10 on the outside.

Accordingly, to produce a coil assembly 11, an integral or multipartite coil former 12 initially is provided and is composed of a ceramic material, preferably a ceramic sintered material comprising aluminum oxide or aluminum nitrite or silicon nitrite.

This coil former 12 is used as at least part of a mold. The coil 13 is composed of the metal material that is molded onto the coil former 12 or is molded into said coil former. The coil former 12 forms an inner shell or an inner part of a multipartite mold. An outer shell or an outer part of the mold can be removed and reused after the coil assembly 11 has been molded.

The present invention accordingly covers the use of a coil former 12 composed of a ceramic material in the case of a coil assembly 11 of an electrical machine. The coil 13 is composed of the metal material in the form of a coil molding and the coil former 12 is a constituent part of a mold for molding the coil 13. This ensures optimum connection of the metal material of the coil 13 to the ceramic material of the coil former 12, as a result of which heat that is produced in the region of the coil 13 can be dissipated in an optimum manner during operation.

This ensures a high electrical power throughput by the respective coil assembly 11 and therefore ultimately by the electrical machine, as a result of which a high degree of efficiency of the electrical machine can be realized.

Furthermore, the individual coil turns 18 of the coil 13 can be electrically insulated from one another in an optimum manner by the ceramic material of the coil former 12.

What is claimed is:
1. A coil assembly for an electrical machine, comprising a coil former made of an electrically non-conductive ceramic material and including a hollow tubular main body and spaced apart webs projecting radially out from the main body so that outwardly open radially extending spaces are defined between the webs and outward of the main body; and a coil radially out from the main body of the coil former and held in the radially extending spaces between the webs of the coil former, the coil being made of an electrically conductive metal material in the form of a non-stranded coil molding so that the coil completely fills the radially extend- ing spaces between the webs of the coil former and is coupled thermally to the core and the webs of the coil former.

2. The coil assembly of claim 1, wherein the coil former is produced from a ceramic sintered material.

3. The coil assembly of claim 2, wherein the coil is produced from an aluminum material or from a copper material.

4. The coil assembly of claim 1, wherein the webs of the coil former are inserted into the main body and form partition elements between matrices of the conductive metal material molded into the radially extending spaces between the webs to define the coil turns of the coil.

5. The coil assembly of claim 1, wherein the webs of the coil former are integral with the main body of the coil former.

6. An electrical machine comprising at least one rotor-end magnet and the coil assembly of claim 1.

7. The electrical machine of claim 6, wherein the coil former of the coil assembly has a recess inward of the main body, and the electrical machine further has a stator-end support with a projection inserted into the recess in the coil former so that the coil assembly is mounted onto the stator-end support.

8. The electrical machine of claim 7, wherein the projection of the stator-end support projects into the recess in the coil former, so that the coil assembly circumferentially surrounds the projection of the stator-end support.

9. The electrical machine of claim 8, wherein at least the projection of the stator-end support is produced from an iron material.

10. The coil assemble of claim 2, wherein the ceramic sintered material is a ceramic aluminum oxide material or a ceramic aluminum nitride material or a ceramic silicon nitride material.

* * * * *